July 31, 1956    F. L. SHANNON    2,756,441
FOLDING COT
Filed April 9, 1954    2 Sheets-Sheet 1
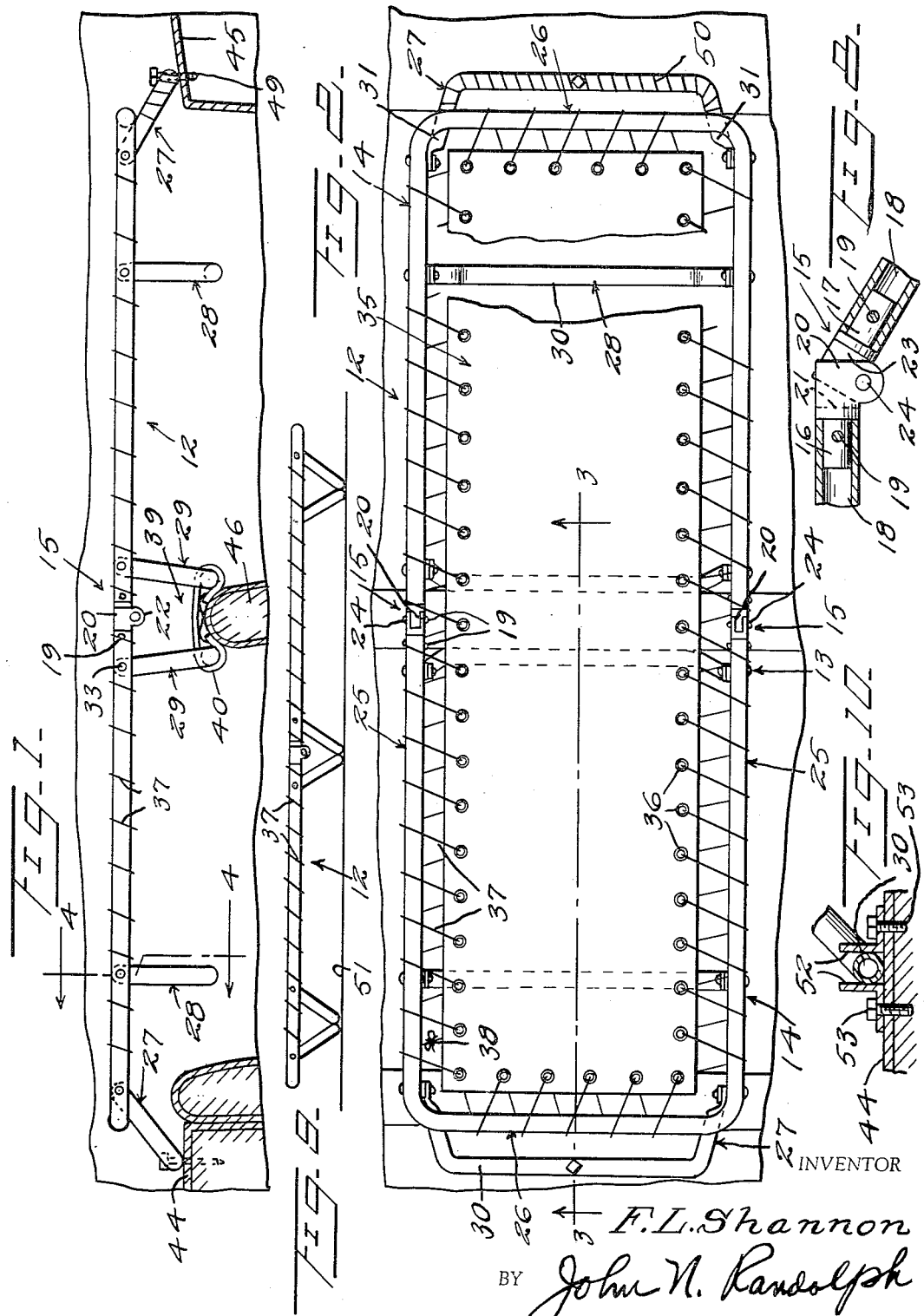
INVENTOR
F. L. Shannon
BY John N. Randolph
ATTORNEY

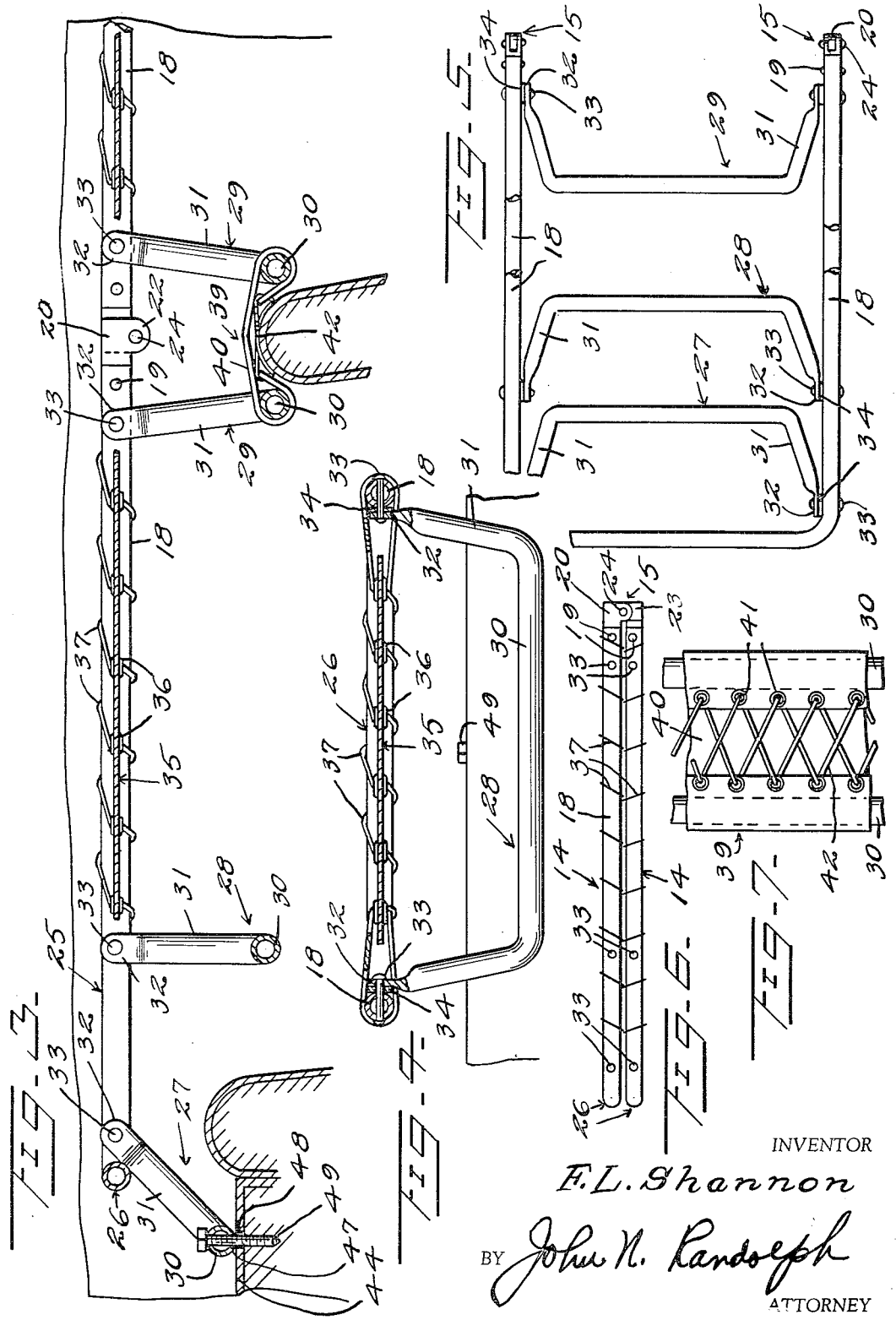

United States Patent Office

2,756,441
Patented July 31, 1956

2,756,441

FOLDING COT

Frank L. Shannon, Winnsboro, S. C.

Application April 9, 1954, Serial No. 422,016

4 Claims. (Cl. 5—111)

This invention relates to a folding cot of general utility, capable of being stored compactly in a folded condition for transportation and storage when not in use and which can be quickly and easily extended and positioned for use in a plurality of locations and positions.

A primary object of the present invention is to provide a cot which may be readily positioned inside of a passenger compartment of an automobile above the level of the vehicle seat to afford comfortable and convenient sleeping accommodations and which will not interfere with luggage or the like stored, for example, on or between the vehicle seats.

Another object of the invention is to provide a cot which may likewise be supported for use on a substantially flat surface such as a floor or the ground and which, when so utilized, may be disposed with the upper body supporting part thereof at different elevations.

Still a further object of the invention is to provide a cot of the aforedescribed character which is relatively light in weight yet of sufficiently durable and rigid construction to adequately support the weight of a heavy adult.

Various other objects and advantages of the invention will hereinafter become more fully apparent from the following description of the drawings, illustrating a presently preferred embodiment thereof, and wherein:

Figure 1 is a side elevational view showing the cot in an extended position and supported within the passenger compartment of an automobile;

Figure 2 is a top plan view thereof;

Figure 3 is an enlarged fragmentary longitudinal sectional view taken substantially along a plane as indicated by the line 3—3 of Figure 2;

Figure 4 is an enlarged transverse sectional view taken substantially along a plane as indicated by the line 4—4 of Figure 1;

Figure 5 is a fragmentary plan view showing the cot frame in a folded position;

Figure 6 is a side elevational view showing the complete cot in a folded position;

Figure 7 is a fragmentary bottom plan view of bottom portions of the center cot legs and showing a saddle member connected thereto;

Figure 8 is a fragmentary sectional view of a portion of the cot frame;

Figure 9 is a side elevational view, on a reduced scale, showing the cot in an extended position and supported on a flat surface, and Figure 10 is a fragmentary sectional view similar to the left-hand end portion of Figure 3 and showing another form of means providing a stop for an end portion of the cot.

Referring more specifically to the drawings, the foldable cot in its entirety and comprising the invention is designated generally 12 and includes an elongated frame, designated generally 13, composed of two corresponding elongated U-shaped members, each designated generally 14, and a pair of hinged connecting units, each designated generally 15. The U-shaped members 14 are preferably of lightweight tubular metal such as aluminum and the ends of the legs thereof are connected in aligned relationship by the connectors 15 which include end portions 16 and 17 sized to fit snugly in the ends of the legs 18 of the U-shaped members 14, as best seen in Figure 8, and which are secured immovably therein by rivets or other fastenings 19 which extend through said members 16 and 17 and through the leg ends 18 engaged thereby. The member 16 of each connector 15 is provided with an enlarged end 20 of substantially the same cross sectional size as the legs 18 and which is disposed beyond the end of the leg 18 in which said member 16 is secured. Each enlargement 20 is provided with a longitudinal slot 21 which opens outwardly of its outer end and which likewise opens downwardly into the space between a pair of depending apertured ears 22 which form depending extensions of the enlargement 20. The connector member 17 has a restricted extension 23 disposed beyond the leg end 18 in which said member 17 is secured. The extension 23 is flat and disposed perpendicular to the axis of the frame 13 to fit turnably in the slot 21 and includes a bottom portion which is disposed between the ears 22 and having an aperture aligning with the apertures of said ears to receive a pivot element 24. As seen in Figures 1 and 2, when the frame ends 14 are disposed coplanar, the ends of the legs 18 abut against the enlargements 20 which is disposed therebetween so as to prevent upward swinging movement of either frame end 14 relatively to the other past a coplanar position of the frame ends. However, it will be apparent that either frame end 14 may be swung downwardly on the pivots 24 relatively to the other so that the frame 13 may assume a folded position as illustrated in Figures 5 and 6 with the frame ends 14 disposed substantially parallel and lying substantially against one another. It will also be apparent that the frame 13 or cot 12 when thus folded, as illustrated in Figures 5 and 6, respectively, will have an overall length of approximately one half the overall length of the extended cot frame. The aligned connected legs 18 and the connectors 15 interposed therebetween form the side rails 25 of the frame 13, and the intermediate portions of the frame ends 14 constitute the end rails 26 of said frame.

An outer supporting leg 27, an intermediate supporting leg 28 and an inner supporting leg 29 is swingably connected to each frame section 14. Each of said legs 27, 28 and 29 is preferably formed of an aluminum tube or other lightweight tubular metal and is substantially U-shaped, including a relatively long straight intermediate portion 30 and end portions 31, which are relatively short as compared to the intermediate portion 30 and which extend from the ends thereof in slightly diverging relationship to one another. The distal ends of the end portions 31 are flattened and apertured as seen at 32 and are swingably connected to the side portions 18 of the U-shaped members 14 by rivets or other pivot means 33. Said distal ends 32 and the leg ends 31 are disposed on the inner sides of or between the rail portions 18, as best illustrated in Figures 2, 4 and 5. Washers 34 are preferably disposed on the rivets 33 between the leg terminals 32 and the rail sections 18 to allow free swinging movement of the legs 27, 28 and 29 relatively to the frame sections 14 and to prevent wear on the rail sections 18.

The cot 12 includes a web or mattress 35 which is disposed within the frame 13 and which extends to adjacent the side rails 25 and end rails 26. The web or mattress 35 may be formed of any suitable flexible material such as canvas or duck, the edges of which may be suitably reinforced, and which is provided with a series of spaced eyelets or grommets 36 along its side edges and ends. The web 35 is secured in the frame 13 by a length of rope, heavy twine or other flexible material which is laced through the eyelets 36 and passed around the rails 25 and 26, the ends of which may be suitably secured together as seen at 38 in Figure 2. The flexible member 37 may possess a limited amount of elasticity or give or otherwise sufficient slack is provided therein so that when the weight of a heavy adult is resting on the web 35, said web will be bulged downwardly to substantially below the level of the underside of the frame 13 but will be disposed above the level of the bottom portions 30 of the legs when said legs are in extended positions, as illustrated in Figures 1 and 9. Likewise, the elasticity or slack in the flexible member 37 will permit portions of said member to be displaced upwardly to permit the legs 27, 28 and 29 to be folded into positions between the rail portions 18 and substantially coplanar with the end setcions 14, as illustrated in Figures 5 and 6.

Where the cot 12 is to be positioned for use in the passenger compartment of an automobile, as illustrated in Figures 1 to 4, the two inner legs 29 are connected by a saddle, designated generally 39, comprising a strip of canvas or duck 40 of a length corresponding approximately to the length of the bottom portions 30 of said legs 29 and which is wrapped therearound, as illustrated in Figures 1, 3 and 7. The canvas strip 40 is provided with grommets or eyelets 41 along its longitudinal edges through which a relatively strong cord or other flexible member 42 is laced, as best illustrated in Figure 7, and secured, to limit the width of the saddle 39 and, accordingly, the extent that the bottom portions 30 of said legs 29 can be spread apart relatively to one another. Obviously, this can be varied by tightening or loosening the lacing 42 or by employing a saddle strip 40 of a greater or lesser width.

The frame 13 is preferably about 7 feet in length and at least 2 feet in width. If it is desired to mount the cot 12 in the interior of a passenger motor vehicle, the end legs 27 are extended outwardly as illustrated in Figures 1 and 2 until their end portions 31 bear against the end rails 26, and the saddle 39 is adjusted around the bottom portions 30 of the inner legs 29, as illustrated in Figures 1 and 3. The bottom portion 30 of one outer leg 27 is then placed to rest upon the rear deck 44 of a passenger motor vehicle, located behind the back rest of the rear seat, and the bottom portion of the other outer leg 27 is positioned to rest upon the top wall 45 which extends between the vehicle instrument panel and the windshield. This is accomplished with the frame 13 in an extended position as illustrated in Figures 1 to 3. The front seat is then adjusted forwardly or rearwardly to position the upper edge of the front back rest 46 as nearly as possible beneath the connectors 15, so that the lower portions of the inner legs 29 can straddle the upper part of the back rest 46 so that the saddle 39 will rest thereon. Obviously, if the back rest 46 extends higher than is illustrated in Figure 1, the saddle 39 may be widened by loosening the lacing 42 or utilizing a wider strip 40. The bottom portions 30 of the outer legs 27 are each provided, intermediate of its ends, with an opening 47, as seen in Figure 3, which is vertically disposed when the leg 27 is in a fully extended position. The rear deck 44 is provided with a drilled hole 48 with which the opening 47 is disposed to register for receiving a headed pin or stud 49 which is dropped downwardly through the openings 47 and 48 to hold said leg 27 so that the cot 12 cannot slide longitudinally of the vehicle. Likewise, if desired, although it is not necessary, a second stud 49 may be employed through the opening of the other outer leg 27, as seen in Figure 1, and which may be passed through the opening 47 thereof and through an opening, not shown, in the top wall 45. However, the opening in the wall 45 need not be provided and the second stud 49 need not be used. To prevent scratching the top surface of the wall 45, the leg 27 which rests thereon preferably contains a fabric wrapping 50, as seen in Figures 1 and 2. If desired, a similar wrapping may be provided on the other leg 27. Additionally, the top surface of the wall 45 may be padded with a towel or other suitable means on which the leg bottom 30 may rest. It will thus be seen that with the cot 12 disposed as illustrated in Figures 1 to 3, that a convenient bed is provided within a passenger automobile which may be effectively used by one person. The cot 12 is disposed along the right-hand side of the interior of the passenger compartment, to the right of the driver's seat, so that the cot can afford sleeping accommodations for one person while the vehicle is being driven by another person. It will also be apparent that use of the cot will not interfere with the use of one half of the rear seat or with storage of luggage or other equipment on the floor or seats beneath the cot.

The cot 12 may also be utilized as illustrated in Figure 9 on a flat surface such as a floor or the ground with the frame 13 extended and with the adjacent legs 27 and 28 disposed in downwardly converging relationship and with the legs 29 similarly disposed. With the legs thus arranged, the bottom portions 30 of the adjacent legs will be positioned in abutting or substantially abutting relationship to support the cot 12 on a horizontal surface 51, such as the ground or a floor. Likewise, the cot 12 may be supported on the surface 51 at a lower level by positioning the legs 27 as seen in Figure 1 and by swinging the legs 28 and 29 upwardly toward positions coplanar with the frame 13.

In Figure 10, a cleat 52 formed of angle iron is shown secured by a fastening 53 to the rear deck 44 to provide an abutment or stop against which the leg portion 30 which rests upon said rear deck may bear. If desired, said cleat 52 may be employed in lieu of the anchoring stud 49.

When the cot is not in use, the legs 29 are swung outwardly and the legs 27 and 28 are swung inwardly relatively to the frame sections 14 after which one frame section 14 is swung relatively to the other on the pivots or hinges 24 to position the cot 12 in its folded position of Figure 6 with the frame sections in substantially abutting engagement and with the legs 27, 28 and 29 disposed therebetween. The cot 12 as thus folded may be conveniently stored, as for example in the trunk of a vehicle.

Various modifications and changes are contemplated and may obviously be resorted to, without departing from the spirit or scope of the invention as hereinafter defined by the appended claims.

I claim as my invention:

1. A cot of the character described comprising an elongated frame including corresponding substantially U-shaped end sections, connector members formed of pivotally connected end portions, said end portions being secured to complementary ends of the frame sections and combining therewith to form an elongated rectangular frame composed of pivotally connected end sections, said connector members having abutment portions interposed between the frame sections to prevent swinging movement of the frame sections in one direction past coplanar positions, a flexible load supporting web disposed within and secured to the side portions and end portions of said frame, said cot including a plurality of supporting legs, each of said legs being substantially U-shaped and having end portions swingably connected to the side portions of the frame for swinging movement about axes disposed transversely of the frame, said legs being mounted on the inner sides of said side portions for swinging movement to folded positions substantially coplanar with the frame, each of said frame sections including a plurality of said legs, one pair of said legs constituting outer legs and being connected to the frame adjacent the ends thereof and extending downwardly and outwardly from the frame when in extended positions and bearing against the end portions of the frame, one of said outer legs being adapted to rest upon the rear deck and the other of said outer legs being adapted to rest upon an instrument panel top wall of a passenger motor vehicle, a second pair of the legs, constituting inner legs, being swingably connected to the frame sections near their connected ends, bottom portions of said inner legs being adapted to straddle the upper part of a front seat back rest, and a flexible saddle member adjustably secured around and extending between the bottom portions of said inner legs and being adapted to engage over the upper edge of the back rest to cooperate with said inner legs and outer legs for supporting the cot within the passenger compartment of an automobile above the front and rear seat back rests and substantially beneath the vehicle roof.

2. A cot as in claim 1, and a headed anchoring stud removably disposed in and extending downwardly through the bottom portion of one of said outer legs, said stud being adapted to engage an opening in the rear deck on which said bottom leg portion rests for retaining the cot against longitudinal movement.

3. A cot as in claim 1, and abutment means fixed to and rising from said rear deck and bearing against the bottom portion of the leg which rests thereon to retain the cot against longitudinal sliding movement.

4. A cot of the character described comprising an elongated rectangular frame including side rails and end rails, a plurality of substantially U-shaped legs having ends swingably connected to said side rails for swinging movement about axes disposed transversely of the frame and substantially straight intermediate portions, said legs being disposed on the inner side of the frame for swinging movement to folded positions within and substantially coplanar with the frame, said plurality of legs including a pair of outer legs disposed adjacent the end rails, a pair of spaced inner legs located substantially intermediate of the ends of the frame, and intermediate legs located between the inner and outer legs and nearer said outer legs, said outer leg and intermediate leg at each end of the frame extending downwardly from the frame in converging relationship to one another and having the intermediate portions thereof disposed in abutting engagement with one another and adapted to rest upon a supporting surface for supporting one another in inclined positions, said inner legs extending downwardly in converging relationship to one another and having the intermediate portions thereof disposed in abutting engagement with one another and adapted to rest upon a supporting surface for supporting one another in inclined positions and to cooperate with the outer legs and intermediate legs for supporting the frame above the surface on which the intermediate portions of said legs rest, and an elongated flexible sheet member constituting a load supporting web disposed within and secured to the side rails and end rails of said frame.

References Cited in the file of this patent

UNITED STATES PATENTS

| | | |
|---|---|---|
| 32,884 | Mettam | July 23, 1861 |
| 38,827 | Housiaux | June 9, 1863 |
| 1,291,704 | Aldrich | Jan. 21, 1919 |
| 1,316,662 | Winzeler | Sept. 23, 1919 |
| 1,659,887 | McLean | Feb. 21, 1928 |
| 1,943,648 | Wessman | Jan. 16, 1934 |
| 2,370,990 | Nissen | Mar. 6, 1945 |
| 2,542,744 | Willens | Feb. 20, 1951 |

FOREIGN PATENTS

| | | |
|---|---|---|
| 383,602 | Great Britain | Feb. 9, 1931 |
| 401,780 | Great Britain | Nov. 23, 1933 |
| 658,680 | Great Britain | Oct. 10, 1951 |